Patented Oct. 9, 1951

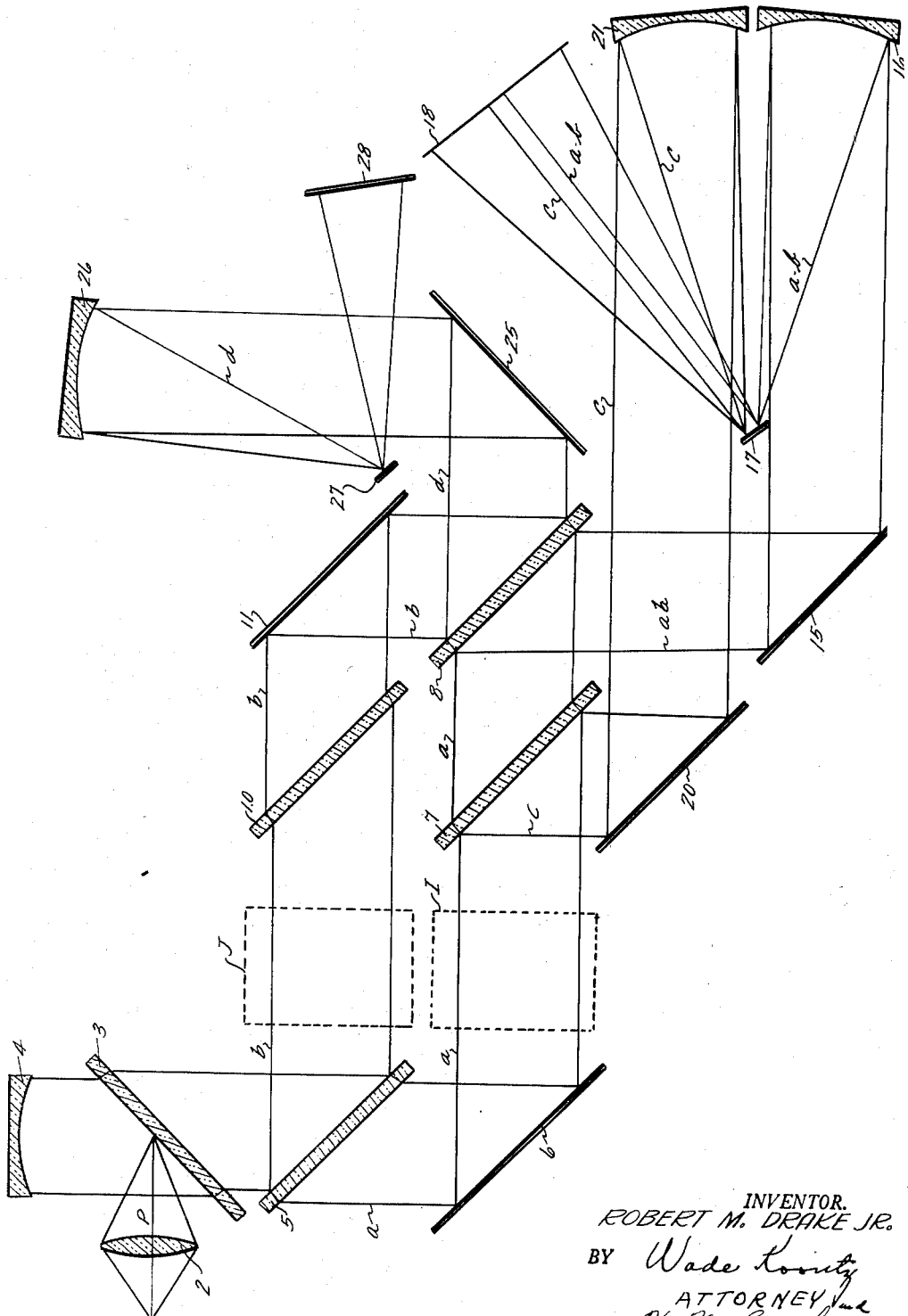

2,570,219

UNITED STATES PATENT OFFICE 2,570,219

INTERFEROMETER DEVICE HAVING A PERMANENTLY POSITIONED INTERFERENCE PATTERN VIEWING SCREEN

Robert M. Drake, Jr., Albany, Calif.

Application May 31, 1949, Serial No. 96,384

1 Claim. (Cl. 88—14)

(Granted under the act of March 3, 1883, as amended April 30, 1928; 370 O. G. 757)

The invention described herein may be manufactured and used by or for the United States Government for governmental purposes without payment to me of any royalty thereon.

This invention relates to interferometer devices of the Mach-Zehnder four-plate type that may be combined with the Toepler-Schlieren system of producing both light interference pictures and field density pictures in which the provision is made for recovering light lost from the last beam splitting plate to produce a visual light interference pattern of the tested medium for continuous use.

Heretofore it has been the usual practice to place ground glass plates in the field of view or image plane of an interferometer device for visual consideration of the interference pattern in making adjustments of the interferometer mechanism and the ground glass plates thereafter replaced by photographic film, or the like, for recording the light phenomena in the test medium. It is very desirable to be able to view the interference pattern at all times without having to disturb photographic film or plates, or other recording equipment, such that the photographic or recording equipment may be operated at any instant or for any length of time which the operator may choose by reference to the viewing screen.

In accordance with this invention, an interferometer, basically the Mach-Zehnder four-plate system, with or without splitting plates for separating the light rays to produce Schlieren pictures, is modified to the extent that the light rays lost by reflection and transmission from the last glass splitting plate, where the two interference beams are re-united, are recovered by reflection, and concentrated on a ground glass plate for visual consideration of the interference pattern of the tested medium. Ordinarily, about twenty per cent of the light from the source was lost or discarded as a result of this one reflected and transmitted interference beam at the last glass splitting plate of the interferometer system not being used. In order to increase the light intensity on a ground glass screen of the beam recovered for use, the coatings on the glass splitting plates are apllied to proportion transmitted and reflected light such that the distribution of light is sufficient for all recording and viewing appliances. This invention therefore has for its object the provision of a viewing screen for utilizing the secondary interference beam emerging from the last glass splitting plate of a four-plate interferometer system for visual consideration of the interference pattern falling on the image plane of recording instruments from the primary interference beam.

These and other objects and advantages will become more apparent as the description proceeds when taken in view of the accompanying drawing in which a diagrammatical view shows the relative position of the optical elements of the interferometer system incorporating the interference pattern visual means of this invention.

Referring to the figure of the drawing, there is illustrated a light source 1 which emits a principal light beam P that passes through a condenser lens 2 where the beam rays are brought to a focus on a semi-transparent light splitting glass plate 3 set at approximately 45° to the light source and thereafter reflected to a concave front surface mirror 4. The principal light beam P is reflected backwardly in parallel rays from the mirror 4 through the splitting plate 3 onto a second semi-transparent light splitting glass plate 5. Where desirable, a light source may be positioned at the focal point of a lens system producing parallel rays in place of the elements 2, 3 and 4. The splitting plate 5 is disposed at approximately 45° to the principal light beam P from the mirror 4 which splits the light beam P into two partial beams, one partial light beam $a$ being transmitted and the other partial light beam $b$ being reflected. The glass plate 5 is coated such that approximately 26 per cent of the light is reflected for partial beam $b$ and 51 per cent is transmitted for partial beam $a$ as by using a silver or aluminum coating material on the side of the incident light beam P.

The partial light beam $a$ is reflected from a front surface mirror 6 which is set approximately 45° to the incident light beam, as is well known in the Mach-Zehnder interferometer device, to direct the partial light beam $a$ onto a semi-transparent glass splitting plate 7. The glass splitting plate 7, also disposed approximately 45° to the incident light beam, is coated with silver, or the like, to transmit approximately 48 per cent and to reflect approximately 48 per cent of the partial light beam $a$. The transmitted partial light beam $a$ passes on to another semi-transparent glass splitting plate 8 that is positioned at approximately 45° to the incident light beam. Like splitting plate 7, splitting plate 8 is coated to transmit approximately 48 per cent and to reflect approximately 48 per cent of the partial light beams striking it.

Partial light beam $a$ is rejoined at the splitting plate 8 by the partial light beam $b$ which was reflected by the splitting plate 5. Partial light beam $b$, after being reflected by the splitting plate 5, passes through a glass compensating plate 10 arranged at approximately 45° to the incident light beam and parallel to the splitting plate 7 to compensate in the partial light beam path $b$ for the optical distance increase in the partial light beam path $a$ caused by the splitting plate 7. After being transmitted through the glass compensating plate 10, the partial light beam $b$ is reflected on a front surface mirror 11 set at approximately 45° to the incident partial light beam $b$ and substantially parallel to the mirror 6 to re-unite partial light beams $a$ and $b$ at the splitting plate 8. The partial light beam $b$, like the partial light beam $a$, is approximately 48 per cent reflected and approximately 48 per cent transmitted by the splitting plate 8.

The reflected partial light beam $a$ and the transmitted partial light beam $b$ are re-united at the splitting plate 8 to form the interference beam, referred to herein as $ab$, which strike a front surface mirror 15. The interference beam $ab$ is reflected from the mirror 15 onto the concave front surface mirror 16 where it is reflected back as a converging beam. At the point of convergence, the interference beam $ab$ is reflected from a small front surface mirror 17 to the image plane 18 of a camera, or some other recording device, where the interference pattern may be photographed or recorded as is well known in the Mach-Zehnder interferometer system.

That part of the partial light beam $a$ reflected from the splitting plate 7 is directed approximately at right angles to the incident partial light beam $a$ and is generally referred to herein as the density light beam $c$. Density light beam $c$ is reflected from a front surface mirror 20 and again from a front surface concave mirror 21, similar to the mirror 16, to produce a reflected converging density beam $c$. The converging density beam $c$ is reflected from the small front surface mirror 17 back to the image plane of the camera 18, recorder, or the like, as known of the Schlieren system for recording air density pictures of the tested medium which tested medium is ordinarily placed between the mirror 6 and the splitting plate 7 and illustrated as a test area I by dashed lines. The medium tested may be a flame in open air, or a medium inclosed, as within a wind tunnel. Whenever the tested medium includes optical elements as the windows in a wind tunnel, corresponding optical elements should be placed in the area J in the path of the partial beam $b$ to compensate for the increase in optical distance through the tested medium optical plates. Some of the mirrors and splitting plates are adjustable to regulate the light path length and the light path angulation as is well known in interferometer systems. The optical distance of the interference beam $ab$ from the last splitting plate to the image plane 18 and of the density beam $c$ from the splitting plate 7 to the image plane 18 should be equal as is well recognized in the art.

In order to eliminate the heretofore undesirable practice of first placing a ground glass plate at the image plane 18 to first view the Schlieren picture and the interference pattern for adjusting pattern for adjusting the interferometer device before placing a photographic plate or other recording device in position at this plane, the interference light beam that is reflected from the partial beam $b$ and transmitted from the partial beam $a$ through the splitting plate 8, referred to herein as the interference beam $d$, and ordinarily lost, is recovered by the front surface mirror 25. The recovered light interference beam $d$ is reflected by the mirror 25 and again reflected from a front surface concave mirror 26 into a converging beam that is reflected at its point of convergence or focal point by a small front surface mirror 27 to a ground glass viewing plate 28 at the image plane where the interference pattern may be viewed at all times.

The interference light beam $d$, heretofore lost or adsorbed, amounts to approximately 20 per cent of the primary light beam P at the source. Coatings on the several splitting plates 5, 7, 8 and 10 may be chosen to provide proper light for all the recording and viewing elements. In the present invention, it was found advisable to coat the splitting plate 5 such that it would reflect approximately 26 per cent of light and to transmit approximately 51 per cent of light if metallic coatings are used. The splitting plates 7 and 8 are disclosed herein to both transmit and reflect 48 per cent of the light if metallic coatings are used. In this manner, the interference beams $ab$ and $d$, and the density beam $c$ are all of approximately the same light intensity, each beam being approximately 20 per cent of the primary light beam P at the source. New non-metallic coating materials make it possible to retain a greater percentage of the light upon reflection and transmission, the use of which would greatly increase the resulting intensity of the three emerging light beams of the present invention. Concave mirrors 4, 16, 21 and 26 are illustrated herein since the light lost by reflection from a front surface mirror is less than the light lost through condenser lenses which may be, and are quite often, used and since mirrors can be constructed more easily with less optical aberrations than lenses. The concave mirrors 16, 21 and 26 are set with the conjugate axis of each at a slight angle with respect to the incident rays reflected thereon to focus on the small mirrors 17 and 27, respectively, which are out of the beam paths.

While I have illustrated a preferred embodiment of my invention, it is to be understood that various modifications and changes may be made without departing from the spirit and scope of my invention and I desire to be limited only by the scope of the appended claim.

I claim:

In an interferometer, means for producing a primary beam of collimated light, a partially transparent plane beam splitting mirror inclined across the primary beam for dividing the primary beam into two partial light beams diverging from each other; plane full mirrors inclined across the partial beams in parallel relation to the beam splitting mirror for reflecting the partial beams across each other, one partial beam being adapted to contain a test medium and constitute a test beam and the other partial beam comprising a comparison beam; a second partially transparent beam splitting mirror inclined across the reflected partial beams at the point of intersection in parallel relation to the first partially transparent mirror for passing a portion of each of the partial beams therethrough and reflecting a portion of each of the partial beams therefrom to form two interference beams leaving the opposite sides of the partially transparent mirror in angular relation to each other; a third partially transparent plane mirror inclined across the test beam intermediate the test medium and a second partially transparent mirror in parallel relation to the second partially transparent mirror for reflecting a portion of the test beam laterally in parallel relation to one of the interference beams to form a Schlieren beam; full plane mirror means in the reflected portion of the test beam and in the Schlieren beam, disposed in parallel relation, for reflecting the last mentioned portions of the test and Schlieren beams in adjacent parallel relation; concave mirrors tilted toward each other in each of the last mentioned parallel reflected portions of the interference and Schlieren beams to dispose their focal points between the last mentioned reflected light beam portions; a plane mirror inclined across the beam portions reflected by the concave mirrors at substantially the concave mirror focal points for reflecting the last mentioned beam portions to a common image plane in adjacent side by side relation; a screen disposed in said image plane for receiving the reflected interference and Schlieren beam portions thereon to form interference and Schlieren images; a plane full mirror inclined across the other interference beam to reflect the same laterally; a concave mirror inclined across the said reflected portion of the other interference beams to dispose the concave mirror focal point at one side of the reflected portion of said other interference beam; a plane full mirror inclined across the focal point of the last mentioned concave mirror for reflecting the said other interference beam portion to an image plane; and an image viewing screen in the last mentioned image plane.

ROBERT M. DRAKE, Jr.

REFERENCES CITED

The following references are of record in the file of this patent:

UNITED STATES PATENTS

| Number | Name | Date |
| --- | --- | --- |
| 1,484,584 | Tauern et al. | Feb. 19, 1924 |
| 1,957,128 | Ball et al. | May 1, 1934 |
| 2,256,855 | Zobel | Sept. 23, 1941 |
| 2,362,235 | Barnes | Nov. 7, 1944 |
| 2,425,758 | Saunders | Aug. 19, 1947 |

FOREIGN PATENTS

| Number | Country | Date |
| --- | --- | --- |
| 669,880 | France | Aug. 10, 1929 |
| 720,333 | Germany | May 1, 1942 |
| 234,156 | Switzerland | Dec. 16, 1944 |